July 25, 1967 E. G. LOEWEN 3,332,153

TEMPERATURE COMPENSATING SYSTEM

Filed Aug. 31, 1964 2 Sheets-Sheet 1

ERWIN G. LOEWEN
INVENTOR

BY *Arthur T. Nelson*
*Frank C. Parker*
ATTORNEYS

July 25, 1967  E. G. LOEWEN  3,332,153
TEMPERATURE COMPENSATING SYSTEM
Filed Aug. 31, 1964  2 Sheets-Sheet 2
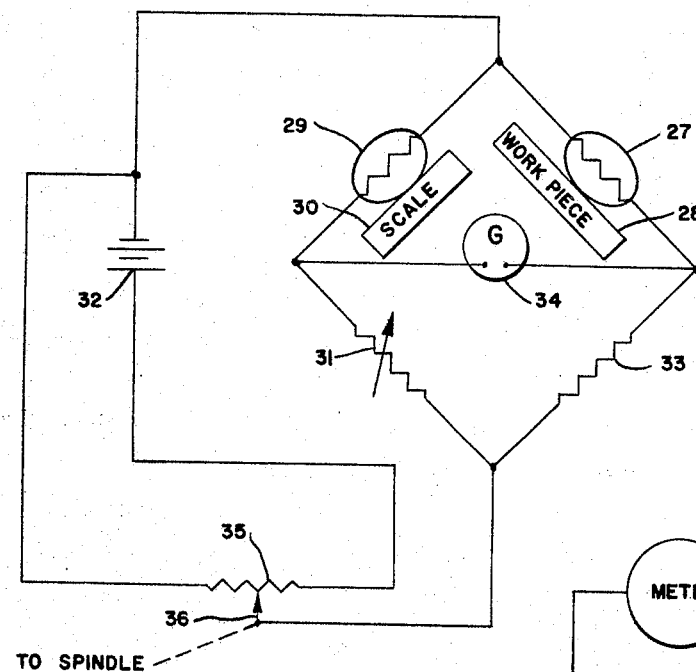
FIG. 4
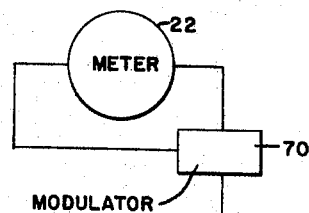
FIG. 5
FIG. 6
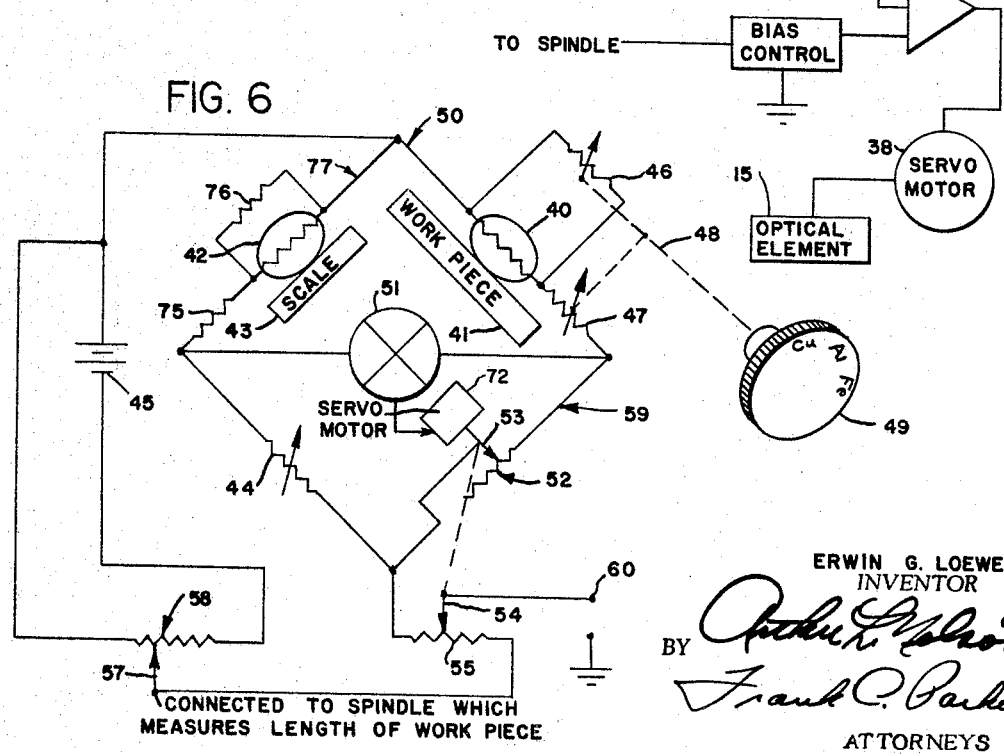
ERWIN G. LOEWEN
INVENTOR
BY
ATTORNEYS United States Patent Office 3,332,153
Patented July 25, 1967

3,332,153
TEMPERATURE COMPENSATING SYSTEM
Erwin G. Loewen, East Rochester, N.Y., assignor to Bausch & Lomb Incorporated, Rochester, N.Y., a corporation of New York
Filed Aug. 31, 1964, Ser. No. 393,199
6 Claims. (Cl. 33—125)

This invention relates to a measuring device and more particularly to a temperature compensating system to simulate constant temperature operating conditions for a measuring device.

Precision measurements of a workpiece may be accomplished in a room of constant temperature. Various elements and materials have a different thermal coefficient of expansion and therefore if the room is held at a constant temperature there are no variations between the measuring device and the workpiece. Controlling the temperature of the shop in which work is done is expensive, and causes considerable delays when workpieces must be allowed to acquire surrounding temperatures. Accordingly this invention provides a temperature compensating system to correct for dimensional differences due to thermal differences between workpiece and measuring devices. The compensating system is accomplished through a temperature correction circuit including temperature sensing elements associated with both the dimensional reference (e.g. scales) and the workpiece, the output of which is a part of a computing bridge circuit which reads out effective temperature differences and can compute the actual linear correction that applies.

It is an object of this invention to simulate a constant operating temperature for a measuring device and workpiece in a normal machine shop environment.

It is a further object of this invention to provide a temperature correction system including temperature sensing elements attached to a measuring reference and the workpiece whose output is a part of a computing bridge circuit indicating a dimensional compensation required for correction due to changing thermal conditions necessary for precision measuring.

The objects of this invention are accomplished by providing an electrical bridge circuit having an electrical temperature sensing element attached to the measuring reference and another temperature sensing element attached to the workpiece. A "zero" adjusting resistor is serially connected across the source of electrical energy with one of the temperature sensing elements. A second resistor is serially connected across the source of electrical energy with the second temperature sensing elements. A measuring device is connected intermediate the junction of series elements in these two parallel circuits which provides either a null balance responsive to a correction in the electrical bridge circuit or a direct readout measuring the unbalance due to the temperature differential of the scale relative to the workpiece. The readout may be a direct indication of the error or provide a corrective means to provide the correct reading of the measuring instrument in compensation for the error.

The preferred embodiments of this invention will be described in the following description and illustrated in the attached drawings.

FIG. 4 illustrates a modification of the bridge circuit utilizing a variable potential being applied to the bridge circuit to vary the readout directly with the length of the workpiece.

FIG. 5 is a modification adapted for use with FIG. 2 wherein the gain of the amplifier is controlled by the length of the workpiece.

FIG. 6 illustrates a modification whereby the coefficient of expansion and length of the workpiece are both automatically considered in the readout.

Figure 1:
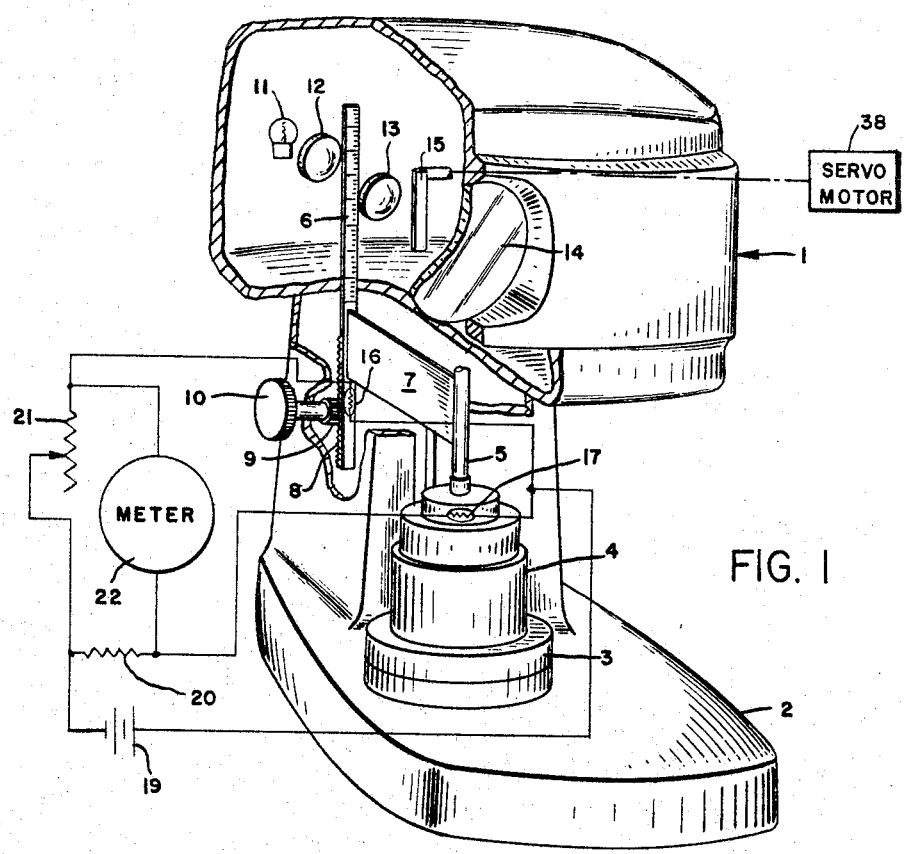
FIG. 1 illustrates a schematic drawing in conjunction with a measuring instrument.

Referring to FIG. 1 a direct reading measuring instrument 1 is illustrated. Portions of the instrument are cut away to illustrate the relative position of the various components within the instrument. The base 2 supports an anvil 3 for mounting the workpiece 4. The spindle 5 is integrally connected to the scale 6. The spindle 5 is connected by link 7 to a rack 8 which is driven by a pinion 9 connected to a knurled knob 10. The scale 6 extends upwardly into the optical system which includes a source of illumination 11, a collimating lens 12 and a projecting lens system 13. The image of the scale 6 is ordinarily projected on the screen 14 to provide a visible indication of the reading on the scale 6. The scale reading projected on the screen is dependent on the length of the workpiece 4.

An optical element 15 is also positioned in the optical system to deflect the apparent position of the scale 6 as read on the screen 14. The optical element 15 may be operated by servomotor 38 and will be discussed subsequently relative to the readout system for the temperature compensating system.

The spindle 5 is positioned on the upper surface of the workpiece 4 to provide a reading of the length of the workpiece. A variable resistance temperature sensing element 16 is positioned on the scale 6. A second variable temperature sensing resistance element 17 is positioned on the workpiece 4. These variable resistance elements may be thermistors or similar devices which operate to vary the resistance of the element in response to change in temperature. The junction of the variable resistance elements 16 and 17 is connected to a source of electrical energy 19. The opposite end of the source of electrical energy 19 is connected to a junction of a resistor 20 and a variable resistor 21. The variable resistor 21 and the temperature sensing element 16 are connected serially across the source of electrical energy 19. The resistor 20 is connected serially across the source of electrical energy 19 with the temperature sensing element 17. Intermediate the junctions of the variable resistance 21 and the temperature sensing element 16 and the junction connecting the resistor 20 and the temperature sensing element 17 is connected a meter 22. The connection of these electrical components forms a bridge circuit which indicates units per unit length in the meter readout responsive to the relative temperature difference between the temperature sensing element 16 and the temperature sensing element 17 on the scale 6 and the workpiece 4 respectively. The meter 22 may be calibrated to give a direct reading in microunits which must be multiplied by the length of the workpiece to give the correction necessary for the linear differential due to temperature variation from a predetermined standard temperature room condition. The schematic diagram illustrated in FIG. 1 will operate for one coefficient of expansion of a workpiece if a single meter scale and meter sensitivity is used.

Figure 2:
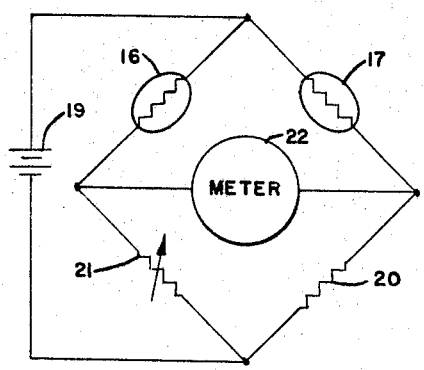
FIG. 2 illustrates a simplified circuit diagram of the bridge circuit.

The electrical diagram as illustrated in FIG. 1 is illustrated in a simplified form in FIG. 2. The variable resistor 21 is a "zero" adjusting resistor to provide a balanced bridge circuit in which the meter indicates a "zero" reading so long as the thermistors 16 and 17 are at the same temperature. As the temperature in the room increases over the predetermined constant temperature, which for the purpose of illustration may be considered 68° F., the temperature of the scale and the workpiece may increase at the same rate and therefore with like coefficients of expansions of the scale and the workpiece no compensation is necessary. The temperature sensing element 16 and 17 will not then indicate an unbalance. The meter 22 will read "zero" and no correction is indicated. If, however, the temperature of the scale and the workpiece varies relative to each other, which is generally true, then a compensation for variation of linear dimensions due to differential thermal expansions is necessary. This will be shown by an unbalance reading of the meter 22. The reading is generated when one of the temperature sensing elements 16 or 17 changes relative to the other. If the meter reads in microunits of correction necessary per unit dimension of the workpiece then the reading of the meter must be multiplied by the overall linear dimension of the workpiece provided at least that the latter is at a uniform temperature of its own, which may take 1 to 10 minutes to achieve.

Figure 3:
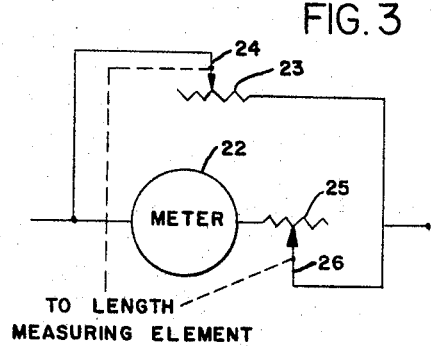
FIG. 3 is a modification which may be used in conjunction with FIG. 2 to provide analog multiplication or automatic addition to compensate for the length of the workpiece being measured.

FIG. 3 illustrates a means whereby an analog multiplication of the linear dimension of the workpiece may be achieved automatically. The multiplication device as illustrated may be used to accommodate measurements of different materials where the circuit is designed for unidirectional adjustment. A parallel resistor 23 shunts the meter 22 and the arm causes a variation in the resistivity across the resistor 23 and is connected to the spindle 5 which measures the length of the workpiece 3 then the readout of the meter may be calibrated to automatically read the microunits for the overall length for the workpiece 4. The same multiplication may be accomplished if a series resistor 25 having an arm 26 to vary the resistivity of the resistor in response to the length of the workpiece 4 is connected in the manner as illustrated to give a direct reading in microunits of correction needed for linear dimension change due to variation in temperature relative between the scale 6 and the workpiece 4. Either a series, or parallel resistor would be used although both are illustrated in FIG. 3.

Referring to FIG. 4 a galvanometer 34 is used as the readout element. The thermistor 27 engages the workpiece 28 and the thermistor 29 engages the scale 30. A "zero" adjusting resistor 31 is serially connected with a thermistor 29 to the source 32 through potentiometer 35. The resistor 33 is serially connected with the thermistor 27 to the source 32 through potentiometer 35. The lower ends of the thermistor 29 and 27 form junctions with 31 and 33 respectively which are connected to the galvanometer 34. The bridge circuit operates generally similar to that described in FIG. 2 except that the source of electrical energy 32 is not connected directly across the bridge but is connected through the potentiometer 35. The potentiometer arm 36 contacts the potentiometer 35 at a variable point of contact responsive to the position of the spindle 5 which measure the length of the workpiece 4. The potential at the point of contact on the potentiometer is then applied to the bridge circuit. The variation in potential applied to the bridge circuit varies the output of the galvanometer which in turn automatically provides the necessary computation to allow for a variable length of the workpiece.

FIG. 5 illustrates a modification whereby the meter 22 as illustrated in FIG. 2 may be directly connected to an amplifier 37. The amplifier 37 has a variable gain which is controlled by the position of the spindle 5 and hence the overall linear dimension of the workpiece 4. The variable gain may be controlled through the variation of the bias on the amplifier or the variation of the signal applied to the amplifier or any other suitable means. A bias control is illustrated. The modulator 70 modulates the output from the bridge circuit which is then applied to the amplifier 37. The output from the amplifier 37 operates a servomotor 38 which is connected to the optical element 15. The optical element 15 is illustrated in FIG. 1 which is rotated to shift the apparent position of the scale and thereby correct for linear variation in length of the workpiece due to variable thermal conditions.

Referring to FIG. 6 an additional feature is illustrated. The thermistor 40 is connected to the workpiece 41. The thermistor 42 is connected to the scale 43. The "zero" adjusting resistor 44 is serially connected with the thermistor 42 across the source of electrical energy 45. The thermistor 40 is shunted by a variable resistor 46 and connected in series with a variable resistor 47. The resistors 46 and 47 are gang connected through the control arm 48. The gang connection to the control knob 48 has predetermined positions from known materials for the workpiece. These positions depend on the particular coefficient of expansion. Merely for the purpose of illustration the symbols of copper, aluminum and iron are written on the dial 49 for indicating a different position for the different elements. It is understood that workpieces generally are not elements but alloys or compounds to provide the desired strength, malleability, ductility, conductivity etc. The control knob 48 varies the effect of the changing resistivity of the thermistor 40 by the adjustment of the resistors 46 and 47. In other words the overal resistance of the arm 50 which includes the thermistor 40 shunted by the resistor 46 and serially connected with the resistor 47 will always have a total constant resistance at the reference temperature, 68° F.

The thermistor 42 operates in a balancing arm with arm 50 in the bridge circuit and is selected as having the same thermal response as thermistor 40. A series resistor 75 and parallel resistor 76 are connected in the arm 77 and are approximately equal to the mean value of resistors 47 and 46 respectively. The "zero" adjusting resistor 44 provides a balance in the bridge circuit at the predetermined constant temperature which is made with resistors 46 and 47 at approximately their mean value.

Instead of a meter an error detector 51 is positioned across the bridge circuit connected to the junction of the thermistor 42 and the variable resistance 44 and the junction of the arm 50 with the potentiometer 52. Any electrical unbalance in the bridge circuit is detected by the error detector 51 which is fed into a servomotor 72 which corrects the unbalance by driving the slider arm 53 to a neutral position.

The slider arm 53 is connected to a contact arm 54 which operates on the potentiometer 55. The potential applied to the potentiometer 55 is variable. The potential applied is in direct response to the variable length of the workpiece. The contact arm 57 of the potentiometer 58 is connected to the spindle which measures the length of the workpiece. The bridge circuit 59, and the potentiometers 55 and 58 are connected in series across the source of electrical energy 45. The potential on the arm 57 is in direct response to the length of the workpiece and is applied across the potentiometer 55. The arm 54 applies a voltage to the output terminal 60 in response to the position of the potentiometer arm 53 on the potentiometer 52. In this manner the adjustment required to provide a balance in the bridge circuit indicates the linear dimension in microunits needed to correct for temperature differential between the scale and the workpiece. This error is automatically computed for the length of the workpiece by the use of the potentiometer 58 applying a variable potential to the potentiometer 55. The output may be a direct reading suitable for manual correction on the measuring instrument, or may be used to feed a circuit to optically compensate for the error in reading due to temperature variations.

The device will be described in the following paragraphs. FIG. 1 illustrates a linear measuring instrument wherein the spindle 5 may be manually adjusted to measure the length of the workpiece 4. An optical readout system including the source of illumination 11, the collimating lens means 12 and the projecting lens means 13 to provide a visual readout on the screen 14. This compensating device is illustrated in the bridge circuit associated with the measuring instrument 1. The thermistor 17 is contacting the workpiece 4. The thermistor 16 engages the scale 6. The "zero" adjusting resistor 21 is serially connected with the thermistor 16 across the source of electrical energy 19; the resistor 20 is serially connected with the thermistor 17 across the source of electrical energy 19 to form a bridge circuit. The meter 22 is connected with the junction of thermistor 16 and "zero" adjusting resistor 21 as well as the junction of the thermistor 17 and resistor 20. With a variable temperature of the scale 6 and the workpiece 4 an unbalance is sensed by the meter which is calibrated to read directly in microunits of error necessary to correct for linear dimension of a workpiece. The meter may be calibrated to read in any units desired for example microinches of error necessary to correct for the linear difference between the scale and the workpiece.

FIG. 3 illustrates the two means whereby the length of the workpiece may be compensated for by a shunting or a series resistor in combination with the meter 22.

Referring to FIG. 4 a readout of the galvanometer may be varied to compensate for the length of the workpiece by applying a variable potential which is responsive to the length of the workpiece.

FIG. 5 illustrates a variable gain which may be varied in response to the length of the workpiece to compute automatically the length factor into the readout.

FIG. 6 illustrates a means whereby workpieces of different coefficients of expansion may be measured. The knob 48 presets the variable resistors 46 and 47 and controls current through the thermistor 40 to vary the effective sensitivity of the thermistor 40. This is possible when the coefficient of expansion of the workpiece is known.

In FIG. 6 a function of the variable length of the workpiece is applied to the output by the potentiometer 58 which varies the potential applied to the potentiometer 55. The output of the bridge circuit is through a null balancing error detector which automatically eliminates any electrical unbalance in the circuit and provides a signal which is indicated by the potentiometer 55. The output from terminal 60 may be adapted to provide a correction in the optical readout of the measuring instrument 1 or provide an indication which may be used to manually compensate for any error in the measuring of the workpiece.

The preferred embodiments of this invention have been illustrated and described and it is understood that modifications may be devised which would fall within the scope of this invention which is defined by the attached claims.

I claim:

1. A temperature compensating system for use in a measuring instrument comprising a measuring instrument having a measuring scale for indicating the dimension of a workpiece, an electrical bridge circuit including a temperature sensing element engaging the measuring scale of said instrument and a temperature sensing element for engaging the workpiece being measured in said measuring instrument, means coupled to said bridge circuit for applying an energizing potential thereto, the magnitude of which, is directly related to the dimension of the workpiece being measured, and indicator means coupled to said bridge circuit reading the overall dimensional correction required to compensate for temperature differentials causing differential expansion of said scale relative to said workpiece.

2. A temperature compensating system for use in a measuring instrument including, a scale for indicating a linear dimension of a workpiece, an electrical bridge circuit having energizing means including a temperature sensing element engaging said scale and a temperature sensing element for engaging said workpiece, a meter connected to said temperature sensing elements providing a reading responsive to said elements in said bridge circuit, means connected to said bridge circuit operating responsive to the overall linear dimension measured on said workpiece and modifying the meter reading to thereby provide a readout effectively including the coefficient of expansion and the overall measured dimension of said workpiece.

3. A temperature compensating system for use with a measuring instrument including a scale for indicating a linear dimension of a workpiece, optical means for projecting a portion of said scale corresponding to the dimension of said workpiece on a visible screen comprising an optical element for changing the portion of said scale projected on said screen, an electrical bridge circuit including a temperature sensing element connected to the scale of said instrument and a temperature sensing element for connection to said workpiece in said instrument, means coupled to said bridge circuit for applying an energizing potential to said bridge circuit that is a function of the length of the dimension of said workpiece being measured, an error detector circuit coupled to said bridge circuit for developing a control signal that is a function of the current unbalance in said bridge circuit, a servo system receiving said control signal coupled for driving said optical element to change the portion of said scale on said screen to thereby correct for overall expansions of said scale relative to said workpiece.

4. A temperature compensating system for use with a measuring instrument including a scale for indicating a linear dimension of a workpiece, an electrical bridge circuit having energizing means including a temperature sensitive element connected to said scale and a temperature sensitive element for connection to said workpiece, a variable sensitivity arm in said bridge circuit including said temperature sensitive element for connection to said workpiece varying the effective sensitivity of said temperature sensitive element in accordance with the coefficient of linear expansion of said workpiece, indicator means in said bridge circuit reading the linear dimension of correction required to compensate for unequal expansion of the scale relative to the workpiece.

5. A temperature compensating system for use with a measuring instrument having a scale for indicating a linear dimension on a workpiece comprising an electrical bridge circuit including a temperature sensitive element engaging the scale of said measuring instrument and a second temperature sensitive element for engaging the workpiece received by said measuring instrument, energizing means coupled to said bridge circuit for energizing said bridge circuit as a function of the length of the dimension of said workpiece to be measured, a "zero" adjusting resistor connected to said temperature sensitive element engaging said scale and serially connected across the energizing means, a resistor connected to the temperature sensitive element for engaging said workpiece and serially connected across the energizing means, an error detector circuit coupled to said bridge circuit providing a control signal responsive to the unbalance in the bridge circuit, a servo system receiving the control signal from said error detector, means coupling said servo system to said bridge circuit to provide a correction to overcome unbalance in said bridge circuit and means coupled to said bridge circuit to provide a readout of said compensating system in units of correction necessary to compensate for the overall expansion of the scale relative to the workpiece.

6. A temperature compensating system for use with a measuring instrument having a scale for indicating a linear dimension of a workpiece comprising a temperature sensitive element engaging said scale, a temperature sensitive element for engaging the workpiece received by said measuring instrument, circuit means coupling said temperature sensitive elements to an electrical bridge circuit including a variable element for balancing said bridge circuit, circuit means coupled to one of said temperature sensitive elements for adjusting said bridge circuit for the difference between the coefficient of expansion of said scale and that of said workpiece, means coupled to said bridge circuit for applying an energizing potential to said bridge circuit that is a function of the length of the dimension of said workpiece to be measured, an error detector circuit coupled to said bridge circuit for developing a control signal that is a function of the current unbalance in said bridge circuit, a servo system receiving the control signal from said error detector, means coupling said servo system to said variable element for automatically balancing said bridge circuit, and means coupled to said servo system to provide a signal corresponding to the dimension correction including corrections for the coefficient of expansions and corrections for the overall dimension of said workpiece.

References Cited
UNITED STATES PATENTS 3,142,120   7/1964   Mottu _____ 33—125

LOUIS R. PRINCE, *Primary Examiner.*

WILLIAM A. HENRY II, *Assistant Examiner.*